United States Patent [19]
Scotton

[11] Patent Number: 5,896,572
[45] Date of Patent: Apr. 20, 1999

[54] METHOD OF ADAPTIVE CHANNEL ACQUISITION AT A SUBSCRIBER UNIT

[75] Inventor: Geoffrey R. Scotton, Woodway, Wash.

[73] Assignee: Motorola, Inc., Schaumburg, Ill.

[21] Appl. No.: 08/879,105

[22] Filed: Jun. 19, 1997

Related U.S. Application Data

[63] Continuation of application No. 08/332,209, Oct. 31, 1994, abandoned.

[51] Int. Cl.[6] ............................................. H04Q 7/00
[52] U.S. Cl. ...................................... 455/452; 455/422
[58] Field of Search ............................... 455/422, 450, 455/452, 517, 525, 62, 59, 60, 184.1, 186.1, 89, 185.1, 455, 464

[56] References Cited

U.S. PATENT DOCUMENTS

| | | | |
|---|---|---|---|
| 4,012,597 | 3/1977 | Lynk et al. | 455/34.1 |
| 4,481,670 | 11/1984 | Freeburg . | |
| 4,618,998 | 10/1986 | Kawamura | 455/34.1 |
| 4,905,301 | 2/1990 | Krolopp et al. | 455/34.1 |
| 4,916,728 | 4/1990 | Blair | 455/33.1 |
| 4,954,899 | 9/1990 | Tanabe et al. . | |
| 5,276,905 | 1/1994 | Hurst et al. | 455/62 |
| 5,363,428 | 11/1994 | Nagashima | 455/34.1 |
| 5,448,750 | 9/1995 | Eriksson et al. | 455/34.1 |
| 5,524,280 | 6/1996 | Douthitt et al. | 455/62 |
| 5,564,088 | 10/1996 | Saitoh . | |

OTHER PUBLICATIONS

Co-pending U.S. application, Ser. No. 07/970,735, CM01574H–Scholefield, A Message Delivery Improvement For Data Communications System Using Single Frequency Reuse Networks, Filed: Nov. 2, 1992.

Primary Examiner—Reinhard J. Eisenzopf
Assistant Examiner—Marsha D. Banks-Harold

[57] ABSTRACT

In a data communications system including an infrastructure 100 and a subscriber terminal 115 a method of acquiring an operating channel at the subscriber unit on power up including: turning on the subscriber unit 203; selecting from a data base a most frequently used channel that corresponds to a last operating channel 209; and attempting to acquire service 213 on the most frequently used channel. Alternatively, in a similar setting at a subscriber terminal a method of acquiring a next operating channel including: exiting an operating channel 317; updating 319 a channel occupancy data base 301 with occupancy information corresponding to the operating channel; selecting, from the channel occupancy data base 309, a next operating channel that corresponds to information from past operating channels; and attempting to acquire service 313 on the next operating channel.

9 Claims, 3 Drawing Sheets

METHOD OF ADAPTIVE CHANNEL ACQUISITION AT A SUBSCRIBER UNIT

This is a continuation of application Ser. No. 08/332,209, filed Oct. 31, 1994 and now abandoned.

FIELD OF THE INVENTION

The present disclosure concerns various subscriber attributes or techniques and more particularly but not limited to such attributes that specifically concern methods of channel acquisition at a subscriber unit.

BACKGROUND OF THE INVENTION

As our society becomes more mobile and information dependent the demand for untethered data communications continues to grow. A proliferation of radio data communications systems have been, are being, or will be deployed in an attempt to satisfy this demand. To no ones surprise, these systems, while often occupying or providing coverage to overlapping geographic areas and user groups, do not always lend themselves to providing, alternatively, relatively seamless data message delivery service to a particular subscriber's unit or terminal.

The systems, as deployed and planned, have sought to optimize different criteria depending on the system designers perception of what user groups needs are intended to be addressed by a particular radio data communications system. Such criteria have included various combinations of data message delivery capacity and delivery reliability, conservation of radio frequency spectrum, the economics of system deployment and expansion, and the extent of the desired geographic coverage. The process of optimization often relies on or takes advantage of expected or measured characteristics and content of data messages that are representative of probable system traffic. As a result of the above considerations at least two distinct types of systems, often referred to as a single frequency and multiple frequency reuse systems respectively, have evolved to provide data message delivery to user groups throughout a geographic area. This evolution is such that the present infrastructure from a collective or macro perspective for any one populous geographic region is now often referred to as a general frequency reuse system.

While distinct, both systems include some similar elements, functions, or characteristics. For example, both systems (networks) likely are centrally managed under the control of a network controller and include a plurality of fixed (base) stations arranged and managed to provide data message delivery to subscriber units or stations (portable or mobile terminals) throughout a geographic area. The network controller includes, among others, a data message routing function for selecting the appropriate path or point of origination, such as a base station, to attempt a data message delivery to a particular subscriber station. This path selection will depend in part on an estimate of the geographic location of the particular subscriber station or other system activity and may include when to attempt a data message delivery, which base station to utilize, and therefore, or additionally, which radio channel (a radio channel may represent two radio frequencies, one for receive and one for transmit).

One of these systems, referred to as a multi-frequency reuse (MFR) system, is characterized by typically comparatively small coverage areas with adjacent areas employing different radio channels, thus frequencies, and spatially distant areas reusing the same radio channels. The areas in total provide coverage throughout the intended MFR geographic area. Ordinarily the fixed stations, at least one per area, in this system are continuously transmitting and receiving and subscriber stations, such as portable or mobile stations or units are capable of operating on any legitimate and authorized network channel. The portable stations, by scanning the network channels, etc., can determine or aid in determining there location within the intended MFR geographic area on a more or less real time basis by observing the better quality channels based on signal strength, error rates, etc. The MFR network, although using several radio channels and thus frequencies, can provide significant data message delivery capacity since all areas may be simultaneously and independently active. Said another way, any path within the MFR system will, at least in principle, have a unique radio channel, i.e. frequency.

The second system, referred to as a single frequency reuse (SFR) system, is characterized by a multiplicity of coverage areas where all areas and potential paths are served by the same radio channel. As above, the areas in total provide coverage throughout the intended SFR geographic area. The fixed stations, usually one per area, in the SFR system are not ordinarily all simultaneously and independently active. To demonstrate, since all areas and paths operate on the same radio channel any two or more areas, when simultaneously active (respective fixed stations transmitting), will have an interference region. This region's geographic size and boundary will depend in part on the spatial separation, radio power levels, etc., of the respective base stations. Within this interference region a given portable station likely cannot resolve (successfully receive) a data message from either of the stations unless some further coordination of the base stations is undertaken.

In essence the effective coverage area depends at least in part on activity within other areas of the SFR system. Portable stations used in the SFR system need only operate on the assigned channel for the network and will not be able to directly aid in determining their location within the intended SFR geographic area unless and until an appropriate fixed station is enabled and uniquely identified. The SFR network tends to be viewed as a spectrally efficient and cost effective approach to providing coverage to a comparatively large geographic area. This follows from the limited number of frequencies employed and comparative simplicity of the portable stations, etc. Somewhat offsetting the above noted attributes, resulting from the single channel, interference regions, etc., a SFR system will typically have relatively limited data message delivery capacity and often more complicated data message routing functions.

The characteristics of either of these systems much less the characteristics of a combined system together with the growing popularity of data communications and hence number of systems and subscriber units or stations or terminals mandates that the practitioner in the field pay careful attention to the particulars of a subscriber unit roaming from one geographic area to a second geographic area within a given system, roaming from one system to a second system as well as the particulars of initially finding a channel to operate on. The proliferation of varying forms of data communications systems and channels on which data systems operate can make the task of finding a channel on which to operate time consuming particularly in an SFR system and inconvenient at best.

Generally these topics may be called mobility management. Some straight forward approaches to mobility management have been discussed including, for example, at a subscriber unit simply keying up and transmitting some inquiry type of message and waiting to see if a response is forthcoming each and every time your unit is powered up or each time a data channel you are operating on becomes unsatisfactory. Unfortunately this is unsatisfactory because it wastes valuable system capacity without delivering any data messages, or wastes an inordinate amount of time, further consumes a significant amount of battery capacity if the subscriber unit is battery powered, such as in the case of a portable unit, and may not be allowed by various regulatory agencies, such as the Federal Communications Commission. Additionally, due to the large number of potential channels, frequencies, paths, or stations as well as data protocols, the time delay associated with this technique at its most basic renders the approach simply not practical.

Concerns such as these and practical considerations such as the fact that the subscriber unit rather than the network is likely to best know what data communications attributes and geographic particulars best serve the subscriber unit's needs as well as the economics of manufacturing a 'standard' subscriber unit has resulted in various other mobility management techniques that may be employed by subscriber units. Such techniques include a preloaded list of channels to scan or manually select when the presently used channel fails and must therefore be exited. Another includes a continual scan of possible frequencies on which to register and operate so that if the present registered channel degrades an undo amount the subscriber unit may exit such channel and may begin registration attempts on the other possible channels or frequencies. All such prior art techniques continue to be unsatisfactory for a generalized subscriber unit, either exhibiting inconvenience, wasting system capacity, resulting in excess data message delivery latency, or consuming excess power, that is expecting to have data service on any of the plethora of various data communications networks. Clearly an urgent need exists for improved techniques that address mobility management in general and more particularly methods of initially acquiring an operating channel.

BRIEF DESCRIPTION OF THE DRAWINGS

The features of the present invention which are believed to be novel are set forth with particularity in the appended claims. However, the invention together with further advantages thereof, may best be understood by reference to the accompanying drawings wherein:

DETAILED DESCRIPTION OF A PREFERRED EMBODIMENT

Figure 1:
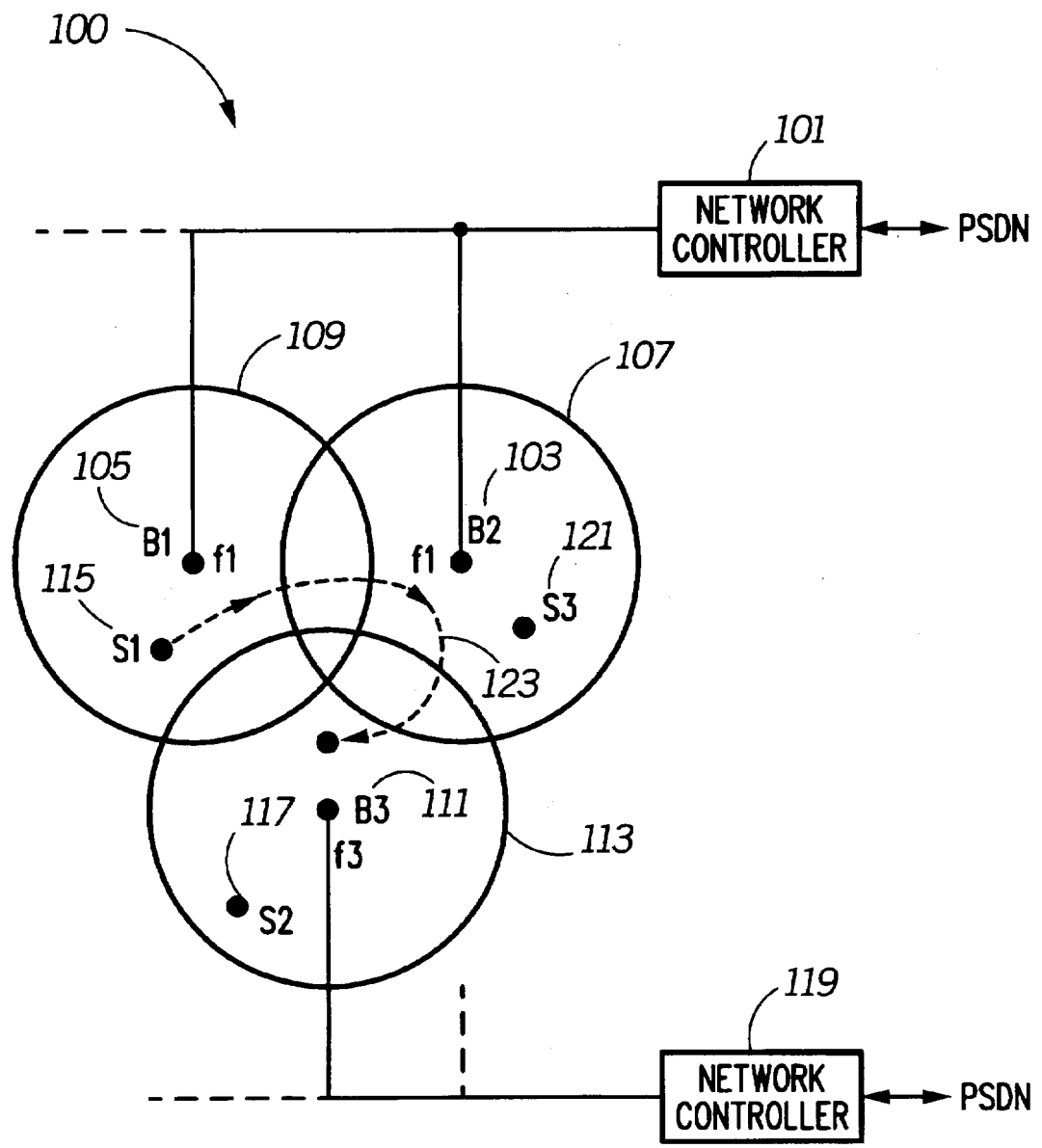
FIG. 1 is a representative diagram of a data communications system suitable for employing a method in accordance with the present invention.

Generally the instant disclosure deals with methods practiced at a subscriber unit operating in a data communications system that are directed to adaptively acquiring an operating channel under various circumstances. In that subscriber units often operate on a more or less systematic routine, including, for example, being powered up at a given location in the morning and traveling a more or less established route, the instant invention seeks to adapt its methods of channel acquisition to such routines thereby significantly shortening the length of time devoted to channel acquisition. One embodiment, set in a data communications system including an infrastructure and a subscriber terminal, is a method of acquiring an operating channel at the subscriber unit on power up including the steps of turning on the subscriber unit, selecting from a data base a most frequently used channel that corresponds to a last operating channel; and attempting to acquire service on the most frequently used channel.

Selecting may further include choosing from the data base a most frequently first selected channel that corresponds to a last operating channel and subsequently a next most frequently first selected channel that corresponds to a last operating channel when the step of attempting to acquire service is unsuccessful and then re attempting to acquire service on the next most frequently first selected channel. Additionally the method of further includes a retaining the last operating channel when the subscriber unit is powered down and updating the data base with information corresponding to the last operating channel.

Alternatively in a similar setting, a subscriber terminal practices a method of adaptively acquiring an operating channel at the subscriber unit including retaining a last used channel when the subscriber unit goes out of service; updating a database with information corresponding to the last used channel; prioritizing the start up data base in accordance with the frequency of occurrence of the information to provide a prioritized data base; selecting, when the subscriber unit next requires service, a highest priority channel from the prioritized data base; and attempting to acquire service on the highest priority channel. Further the method may include a step of choosing from the prioritized data base, when the step of attempting is unsuccessful, a next highest priority channel and attempting to acquire service on the next highest priority channel.

Additionally a method practiced at a subscriber unit or terminal for a acquiring a next operating channel includes; exiting an operating channel; updating a channel occupancy data base with occupancy information corresponding to the operating channel; selecting, from the channel occupancy data base, a next operating channel that corresponds to information from past operating channels; and attempting to acquire service on the next operating channel. The step of selecting further includes choosing from said channel occupancy data base said next operating channel in accordance with occupancy information from said past operating channels. Again if the attempt to acquire service is unsuccessful the method may be extended to include a step of choosing from the channel occupancy data base a further next operating channel in accordance with occupancy information from the past operating channels.

The instant invention may be more fully developed and appreciated with reference to the figures in which FIG. 1 depicts a representative diagram of a data communications system suitable for employing a method of making a channel exit decision in accordance with the present invention. The FIG. 1 data communications system depicts a first infrastructure 100 including a first network controller 101 that is coupled to a public switched data network (PSDN), such as the public switched telephone network, and to one or more base stations, such as base stations B1, B2, etc. 105, 103, etc. Exemplary versions of all equipment are available from suppliers or manufacturers such as Motorola Inc.

Generally the network controller controls the network or infrastructure and coordinates the delivery and receipt of messages to and from the base stations B1 and B2 and there respective origins and destinations. B1 105 has a geographic coverage area 109 within which it may deliver and receive messages from subscriber units, such as subscriber unit S1 115. The subscriber units are available from various manufacturers such as Motorola Inc. under various trade names such as InfoTac. Similarly B2 103 has a geographic coverage area 107 within which it may deliver and receive messages from subscriber units, such as S3 or S1 as S1 travels along the representative path 123. Similarly network controller 119 is coupled to the PSDN and base stations B3 111, etc. and coordinates data message traffic on its respective infrastructure. B3 provides coverage over an area 113 and may provide service to subscriber units, such as S2 117 or S1 115 as it travels along path 123. The base stations B1 and B2 may operate on a single frequency f1 and be part of a single frequency reuse system while base station B3 may operate on f3 and be part of a multi frequency reuse system wherein other base stations on this network and adjacent to B3 operate on distinct frequencies other than f1 or f3. It is understood that FIG. 1 necessarily is a much simplified representative diagram and that actual systems are far more complex with numerous base stations and subscriber units.

Figure 2:
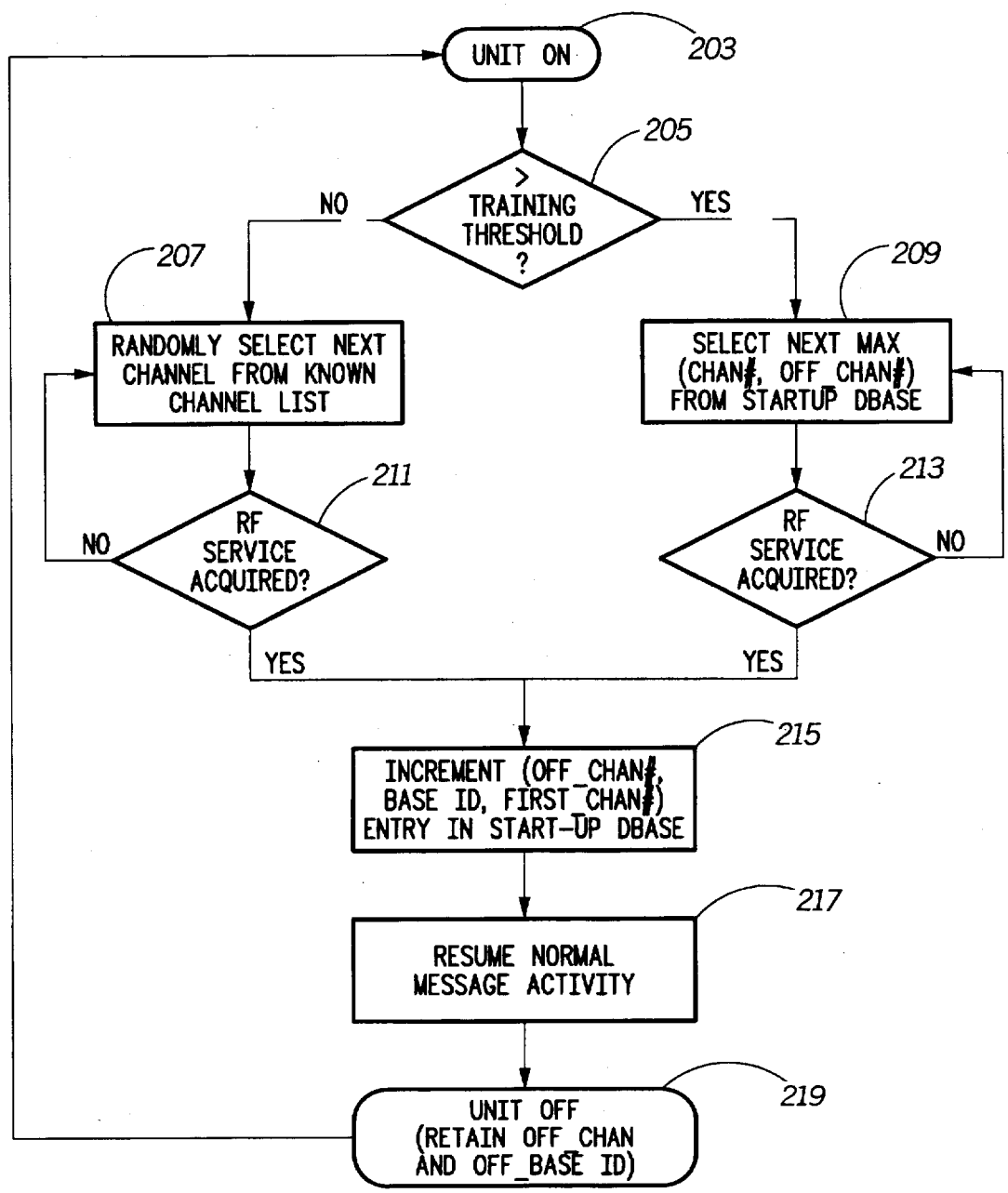
FIG. 2 is a demonstrative flow chart of a method of adaptive channel acquisition in accordance with a preferred embodiment the instant invention.

For purposes of further explanation with reference to the FIG. 2 flow chart consider the situation observed by the subscriber unit S1 115 as it traverses the representative path 123. By observation B1 will initially be best able to provide service, then either B1 or B2, then B2 only, then B2 and B3, and eventually only B3. When powered up and from time to time thereafter S1 will need to make one or more data channel exit decisions as well as select or acquire another data channel to subsequently register on.

Referring to FIG. 2 a preferred method embodiment of acquiring an operating channel at the subscriber unit 115 when the unit is powered up while it traverses the path 123 in the communications system of FIG. 1 will be described. This method is suitable for execution by any general purpose or special purpose processor (not specifically shown but included as part of the subscriber unit) that has been programmed with the appropriate software and is interfaced with or controlling a receiver arranged to receive signals and assess signal strength, etc. Referring to FIG. 2, a data base or start-up database (201) is maintained within the subscriber unit or device or modem device. The database (201) maintains a count of the number of times a specific channel, labeled First-chan# was acquired following prior operation on a particular channel, labeled Off-chan#, and optionally base station, labeled Off-base ID. Initially all channel (and optional base identifiers, if used) entries in the database have a count of zero. Steps 203 through 219 indicate the manner in which the database is maintained and utilized. The method begins at step 203 where the subscriber unit is turned on or powered up and needs to acquire a channel on which to operate and provide data services.

The subscriber unit or device is initially turned on at step (203). The number of times the device or unit has been turned on or powered up is compared to a training threshold at step 205. By referencing the database, with respect to all entries associated with the channel and base identifier that have been recorded during prior operation when the device was turned off, it can be determined if the device has been turned on a sufficient number of times such that a training threshold has been reached (205). The exact value for the training threshold will vary depending upon many system configuration factors, but approximately 10 turn on sequences, following operation on a particular channel and base, is a sufficient amount of prior experience to be a relevant indication for channel selection.

If the training threshold has not been reached, the device will randomly select a channel from a pre-established list of channel identifiers at step (207). The device then attempts to obtain service on the selected channel (211) by scanning the channel, requesting service if a qualified data channel is detected and obtaining service authorization. If all goes well the device has now acquired an operating channel. If service is not acquired at step (211) then another candidate channel is selected from the predetermined or known list of channels at step 207 and service acquisition (211) is repeated. This process continues until service is acquired or the list is exhausted.

When a channel has been acquired or service established, the first acquired channel acquisition count for the acquired channel, including base ID is incremented in the database at step (215). Subsequent to this, the device resumes normal data communication activity and services at step (217) until it is turned off by the user or otherwise goes out of service. At the point that the device is turned off, the data base is updated with information corresponding to the last operating channel, more specifically to reflect the current operating channel number or identifier and base station identifier (if used within the database) at step (219) for subsequent use when the device is again turned on.

Returning to step 205, if the result of this decision point is such that the training threshold is satisfied by the count or number of start-up channel selection samples for the last operating channel (and base station) a possible operating channel is selected at step 209 from the database prioritized in accordance with the count for the last used channels. Specifically, the most frequently used channel, preferably a most frequently first selected channel, corresponding to the last used channel as determined from the data base as the maximum or largest first acquired channel count is selected at step (209). Preferably step 209 chooses the most frequently first selected channel corresponding to the last operating channel. In any event the device then attempts to obtain or acquire service on the most frequently used channel at step (213) by scanning the channel, requesting service if a qualified data channel is detected and obtaining service authorization.

If service is not acquired at step (213) the channel, i.e. the next most frequently first selected channel, with the next largest first acquired channel counts is selected or chosen from the database at step (209) and service acquisition (213) is repeated. This process continues until service is acquired. When a channel or service has been acquired, the database is updated with information, specifically the first acquired channel count for the acquired channel is incremented in the database (215).

Subsequent to this, the device resumes normal data communication activity and services (217) on the now acquired operating channel until turned off by the user. At the point that the device is turned off by the user, the current operation channel identifier and base station identifier (if used within the database) are retained (219) for subsequent use when the device is turned on.

Figure 3:
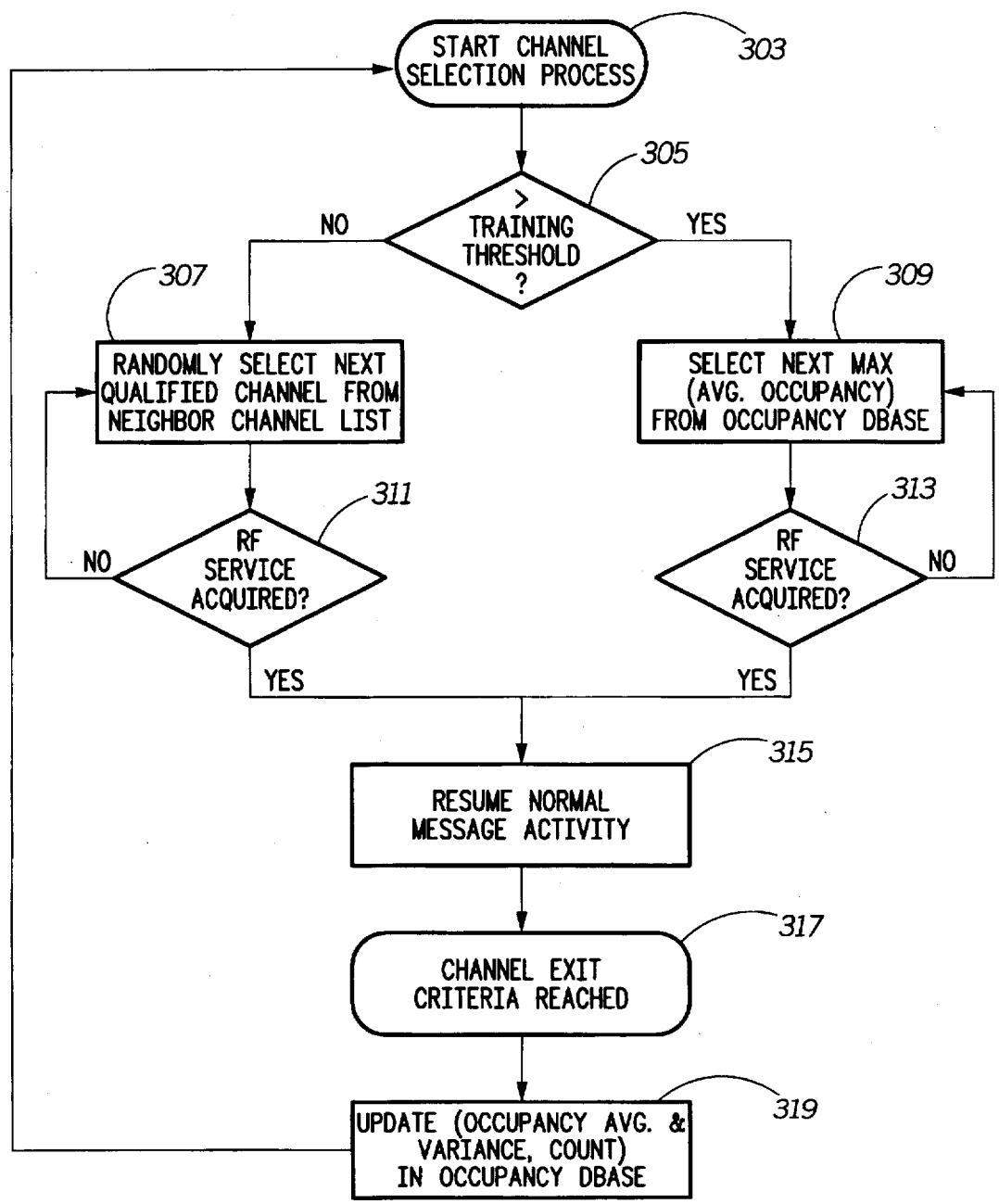
FIG. 3 is a demonstrative flow chart of a method of adaptive channel acquisition in accordance with an alternative preferred embodiment the instant invention.

Referring to FIG. 3 an alternative method of acquiring a next operating channel is described. Here the subscriber unit or device maintains a historical channel list, preferably a channel occupancy database (301). The database (301) maintains a count of the number of times a specific channel and base ID was acquired, and the average time that the device occupied the channel following acquisition. Additionally the variance of the channel occupancy time can be maintained to provide further refinement for the channel selection process by for example favoring a low variance channel over a large variance channel. Initially all channel and base identifiers if used have all channel attributes, such as, average occupancy, occupancy counts and (optional occupancy variance) values initialized to zero. Steps 303 through 319 indicate the manner in which the database is maintained and utilized to aid in acquiring a channel.

Due to a degrading channel quality and/or signal strength, the wireless modem device has determined that it is necessary to roam and consequently initiates the channel selection process (303). This may occur for example as the subscriber unit 115 traverses the path 123 from coverage area 109 to coverage area 107 where rather than seeking service from base station B1 105 the channel associated with B2 103 would be better and should thus be acquired.

At step 305 the number of times the unit has roamed is compared to a training threshold. By referencing the occupancy or historical database, with respect to all entries associated with the channel and base identifier that have been recorded in the database during prior operation, it can be determined if the device has roamed from the current channel/base station combination a sufficient number of times such that a training threshold has been reached (305). The exact value for said training threshold will vary depending upon many system configuration factors, but 10 prior roams from the current channel and base station, is sufficient prior experience to be a relevant indication for channel selection.

If the training threshold has not been reached, the device will randomly select a qualified channel from a predetermined list, preferably a list of neighbor channel identifiers at step (307). The device then attempts to acquire or obtain service on the selected channel at step (311) by scanning the channel, requesting service if a qualified data channel is detected and obtaining service authorization. If service is not acquired (311) then another candidate channel is selected at step 307 from the list of channels and service acquisition (311) is re attempted or repeated. This process continues until service is acquired.

Subsequent to this, the device resumes normal data communication activity and services at step (315) until the device finds it necessary to roam again by noting that various channel exit criteria, such as received signal strength indication are satisfied at step 317. At the point that the device is ready to initiate another roam, the current operating channel is exited and the historical data base is updated, specifically the channel occupancy data base is updated with occupancy information at step 319 corresponding to the current operating channel, such as the channel occupancy count, average occupancy time and variance for the current operating channel and base station based upon the channel occupancy achieved in this instance. This data then becomes the basis for future roaming channel selections or future channel acquisition decisions and the method returns to step 303.

If at step 305, the training threshold has been satisfied, meaning that there has been in excess of the training threshold number of roaming channel selections for the specific channel and base station pair, then a next operating channel corresponding to information from past operating channels is selected from the historical channel list, specifically occupancy data base at step 309. Preferably the possible operating channel selected is chosen as the channel associated with the maximum average channel occupancy corresponding to the last operating channel. The device then attempts to obtain service on the possible next operating channel at step (313) by scanning the channel, requesting service if a qualified data channel is detected and obtaining service authorization.

If service is not acquired at step 313 the channel with the next best channel occupancy is selected from the database at step 309 and a service acquisition attempt at step (313) is repeated. This process continues until service is acquired or the list is exhausted.

Subsequent to this, the device resumes normal data communication activity and services at step (317) until the device finds it necessary to roam again at step 317. At the point that the device is ready to initiate another roam, step 319 is repeated and the method returns to step 303.

While the FIG. 2 and FIG. 3 channel acquisition methods demonstrate preferred embodiments it will be clear to those of ordinary skill in the art that many variants within the true scope and spirit of the instant invention are possible. Such variants that provide the sought after advantages of the instant invention, including, for example, on average shorter channel acquisition latency and the advantages that flow there from such as greater operator convenience, improved battery life and increased system capacity will likely depend on the specific data base contents. As one of but two examples, consider a subscriber terminal that routinely and frequently interacts with the system and follows a well established pattern of usage or very seldom changes coverage zones. The data bases discussed above appear to work quite well for such a unit.

In contrast consider a subscriber unit that routinely operates in either of two distant locations. For such a unit it may well be that the data base should include additionally some form of date or day stamp in order to minimize channel acquisition latency on power up. The optimum data base contents a specific subscriber or perhaps even a specific system may thus be dependent on the actual usage patterns that are circumstance dependent. All such variants that take advantage of the adaptive channel acquisition methods for subscriber units as taught by the instant invention are considered to be within the true scope and spirit of the same.

It will be appreciated by those of ordinary skill in the art that the apparatus and methods disclosed provide various advantageous methods of adaptively acquiring a channel at a subscriber unit operating in a data communications channel. These inventive methods may be readily and advantageously employed in a subscriber terminal or other communications device or system to minimize channel acquisition latency on a unit by unit basis, without otherwise sacrificing network service characteristics. Hence, the present invention, in furtherance of satisfying a long-felt and growing (given the proliferation of data systems and thus potential operating channels) need for improved channel acquisition latency, provides an exemplary method of channel acquisition that adapts to usage patterns on a terminal by terminal basis thus significantly reducing average channel acquisition latency for many terminals.

It will be apparent to those skilled in the art that the disclosed invention may be modified in numerous ways and may assume many embodiments other than the preferred form specifically set out and described above. Accordingly, it is intended by the appended claims to cover all modifications of the invention which fall within the true spirit and scope of the invention.

What is claimed is:

1. In a data communications system including an infrastructure and a subscriber terminal, a method of acquiring an operating channel at a subscriber unit on power up comprising the steps of:

maintaining a database having at least a current last used operating channel, a list of start-up channels successfully used with a last used operating channel and a count of instances when a particular start-up channel was successfully used with a particular last used operating channel for a given last operating channel;

turning on the subscriber unit;

identifying the current last used operating channel;

selecting, dependent on the step of identifying and dependent on the count of instances, from the database the particular start-up channel that is a first most frequently used channel to power up the subscriber unit; thereby providing a preferred channel; and attempting to acquire service on the preferred channel.

2. The method of claim 1 further comprising the step of choosing from the data base a second most frequently used start-up channel that corresponds to the last operating channel when the step of attempting to acquire service on the preferred channel is unsuccessful.

3. The method of claim 2 further comprising the step of re-attempting to acquire service on the second most frequently used start-up channel.

4. The method of claim 3 further comprising the step of retaining the last operating channel when the subscriber unit is powered down.

5. The method of claim 4 further comprising the step of updating the database with information corresponding to the last operating channel.

6. In a data communications system including an infrastructure and a subscriber unit, a method of adaptively acquiring an operating channel at a subscriber unit comprising the steps of:

retaining a last used channel when the subscriber unit goes out of service;

acquiring a subsequent start-up channel when the subscriber unit next requires service;

pairing the last used channel with the subsequent start-up channel;

updating a database with information corresponding to the last used channel and the subsequent start-up channel;

prioritizing all start-up channels in the database to create a prioritized database based on how frequently a particular start-up channel is paired with a particular last used channel;

determining a current last used channel;

selecting, when the subscriber unit next requires service, a most frequently used start-up channel that corresponds to the current last used channel; and attempting to acquire service on the most frequently used start-up channel that corresponds to the current last used channel.

7. The method of claim 6 further comprising the steps of:

choosing from the prioritized data base, when the step of attempting to acquire service on the first highest priority channel is unsuccessful, a next highest priority channel; and attempting to acquire service on the second highest priority channel.

8. In a data communications system including an infrastructure and a subscriber unit, a method of acquiring an operating channel at a subscriber unit on power up comprising the steps of:

maintaining a database having at least a current last used operating channel, a list of start-up channels successfully used with a last used operating channel and a count of instances when a particular start-up channel was successfully used with a particular last used operating channel turning on the subscriber unit;

determining a last operating channel;

selecting from a database a most frequently used start-up channel that is a first most frequently used channel to power up the subscriber unit when the subscriber unit powers down on the last operating channel, thereby providing a preferred channel;

attempting to acquire service on the preferred channel; and upon failure to acquire service on the preferred channel, selecting from the database a second-most frequently used start-up channel that is associated with the last operating channel.

9. A method of acquiring an operating channel at a subscriber unit on power up comprising the steps of:

maintaining a database having at least a current last used operating channel, a list of start-up channels successfully used with a last used operating channel and a count of instances when a particular start-up channel was successfully used with a particular last used operating channel;

turning on the subscriber unit;

identifying the current last used operating channel;

selecting, dependent on the step of identifying and dependent on the count of instances, from the database the particular start-up channel that is a first most frequently used channel to power up the subscriber unit, thereby providing a preferred channel; and attempting to acquire service on the preferred channel.

* * * * *